April 22, 1930. M. LOUGHEAD 1,755,830
BRAKE
Filed Nov. 12, 1926
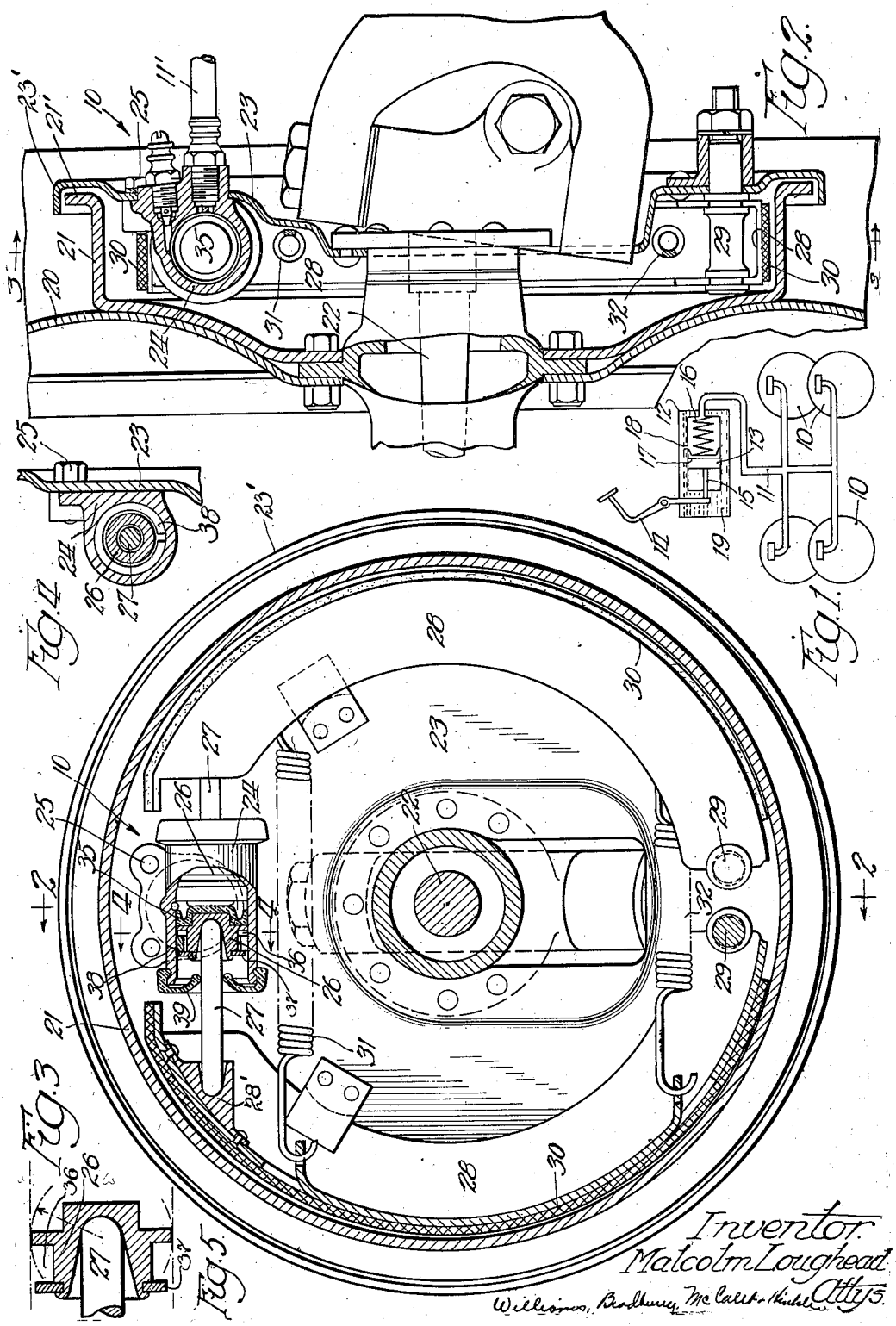
Inventor
Malcolm Loughead
Williams, Bradbury, McCaleb & Hinkle Attys.

Patented Apr. 22, 1930

1,755,830

UNITED STATES PATENT OFFICE

MALCOLM LOUGHEAD, OF DETROIT, MICHIGAN, ASSIGNOR TO HYDRAULIC BRAKE COMPANY, OF DETROIT, MICHIGAN, A CORPORATION OF CALIFORNIA

BRAKE

Application filed November 12, 1926. Serial No. 147,858.

My invention relates to brakes and more particularly to automobile brakes although, as will be seen, it is not necessarily restricted to that use. The primary object of my invention is to provide an automatic take-up mechanism for the brake-shoe (or brake-band) which compensates for the wear of the brake lining or other element subject to wear, but still preserves a constant slack for the brake-shoe.

Another object of my invention is to provide a take-up mechanism which will permit recession as well as progression of the brake applying member, so that the take-up mechanism does not unduly complicate the process of relining and renewing the brake-shoes.

Another object is to compensate for the progression of the brake-shoe applying member so as to utilize at all times the full movement of the brake pedal or other actuator. I accomplish the latter result by an extensible connection between the brake applying member and the actuator, which connection, in the preferred form of my invention, takes the form of a liquid column which is extensible by means of a replenishing device for the liquid column.

The chief advantage of a take-up mechanism for the brakes is that it preserves the full effect of the possible movement of the brake pedal or other actuator, which, if excessive slack were allowed to develop, would be consumed in taking up the excessive slack. In other words, if there is no excessive slack, the full movement of the brake pedal may be utilized to increase the leverage, that is, increase the ratio between the pressure on the brake shoe and the foot pressure on the pedal.

In the preferred form of my invention, I employ a take-up mechanism which embodies stop means between the shoe or the brake applying member and a stationary point—as distinguished from merely lengthening (or contracting, as the case may be) the brake applying member. One of the cooperating stops is mounted so that it can progress on its support under a forceful application of the brakes. Although a non-recessional take-up device such as a ratchet is suitable for this purpose, it has the disadvantage of step-by-step advance which is obviated by the frictional advance of my construction.

A feature of the present invention is mounting the stop to have progressional engagement with a stationary member and a lost motion connection with the brake applying member. In my preferred embodiment of this feature the stop element takes the form of a friction ring slidable under a predetermined force along the cylinder bore of a fluid actuated cylinder and piston for applying the brakes.

An important characteristic of the structure is that the retractile stop advances in one direction under excess braking application pressure and that it withstands the pressure of the brake shoe retractile springs in the other direction.

These and other objects, features and advantages of my invention are set forth in the following description of a particular and preferred embodiment thereof, as illustrated in the accompanying drawings wherein:

Fig. 1 is a diagrammatical layout of the fluid system of a hydraulic braking apparatus for automobiles embodying my invention;

Fig. 2 is a transverse vertical section through the left front wheel of an automobile embodying a braking system such as illustrated diagrammatically in Fig. 1, Fig. 2 being considered as taken on the line 2—2 of Fig. 3 and looking rearwardly;

Fig. 3 is a vertical section taken along the plane of the wheel of Fig. 2 and looking inwardly;

Fig. 4 is a transverse section through the wheel brake cylinder taken on a line 4—4 of Fig. 3 to show the friction ring; and Fig. 5 is a diagrammatic isolated section of the piston showing the details of its construction.

Referring first to the diagram of Fig. 1, the hydraulically actuated wheel brakes 10 on each of the road wheels of an automobile are inter-connected by high pressure hose and tubing 11 with a master cylinder or compressor 12, the piston 13 of which is actuated by the usual brake pedal 14 through suitable linkage 15. As will be later described, the wheel brakes 10 have return springs which, when foot pressure on the pedal 14 is relieved, return the liquid of the system to the cylinder 12 and returns the piston 13 to its normal position. If from any loss of liquid through the fluid system, there is insufficient liquid to return the piston to its normal position, the piston is returned positively by a spring 16, so that the cup packing 17 of the piston uncovers a port 18 in the cylinder wall leading to a vented liquid reservoir 19 in which the cylinder is immersed. Liquid will flow in or through this port, as the case may be, until the liquid system is restored to its required volume. The cup packing 17 also acts as a check valve to permit slippage of liquid from the reservoir 19 into the cylinder during the retraction of the piston and in advance of the uncovering of the port 18, in the event that a suction starts to develop in the cylinder.

Referring next to Figs. 2 and 3 which show the structure of typical wheel brakes 10 of Fig. 1, each wheel 20 carries a brake drum 21, while the steering spindle 22 (or in the case of the rear wheel brakes, the rear axle housing) carries a nonrotating supporting plate 23 which also acts as a dust plate to close the open side of the drum 21. The plate 23 is preferably extended beyond the edge of the drum and flanged thereover as at 23' and the drum itself is also preferably provided with a stiffening flange 21' so that the two flanges together form an effective dust seal for the brakes.

A brake cylinder 24 is mounted on the outer side of the plate 23, that is, on the outer side as regards the center line of the automobile, but within the enclosure formed by the drum and plate 23, and is secured to the plate by suitable bolts or cap screws 25. The cylinder 24 itself is made open at both ends and reciprocally supports a pair of opposed pistons 26, which have ball sockets within which are borne the inner ends of piston links 27.

The outer ends of the piston links 27 are engaged in similar sockets in abutment members 28' the free ends of arcuate internal brake-shoes 28 which are pivotally mounted on the supporting plate 23 diametrically opposite the cylinder 24 by means of pins 29. The pins 29 are eccentric to provide a slight adjustment of the fixed ends of the brake-shoes as regards the distance of their linings from the drum when the shoes are initially installed.

The brake-shoes 28 are of channel cross-section, the linings 30 being secured along their web portions. The free ends of the opposed shoes 28 are urged together by a tension spring 31 and their lower ends by a tension spring 32.

Liquid under pressure from the fluid system of my braking apparatus is, as I previously described, led to the several wheel brakes by high pressure tubing 11, being finally delivered through flexible hose 11' to each brake cylinder 24, as shown in Fig. 2. The liquid enters the cylinder at its midpoint between the opposed pistons 26.

The faces of the pistons 26 each carry cup washers 35 preferably of rubber and held against the piston faces only by the fluid pressure. The face of each piston 26 preferably has a central forward projection, and its associated cup washer is similarly conformed to bring its central portion forwardly of the plane of the annular chisel edge. The forwardly extending portions of the opposed cup washers thus act as stops for the pistons to prevent telescoping of their sealing edges and to space the sealing edges far enough apart to permit the inflow of liquid from the hose 11'.

A short distance outwardly from its face each piston 26 is provided with an annular groove 36, which may conveniently be formed between a shoulder at one end left by radially reducing the piston, and a washer 37 slipped over a second shoulder at the outer end of the piston and secured by peening over the metal of the piston.

Within this groove 36 of the piston a split friction ring 38 is disposed. In the assembly of the wheel cylinder and its pistons, the split ring 38 is contracted from its normal diameter in order to fit the bore of the cylinder, thus giving it a tendency to expand, which holds it in rather firm frictional contact with the cylinder bore. In the commercial embodiment of the brake structure here shown, I prefer that this friction be such that it takes a force of some 85 pounds to force the friction ring along the bore of the cylinder. Until a force of 85 pounds is exerted on the ring, it will obviously act as a stationary stop working in the piston groove 36 limiting reciprocation of the piston to $\frac{1}{32}$ or $\frac{1}{16}$ of an inch or so—the difference between the width of the groove and the width of the ring. This space to which the reciprocation of the piston is limited represents the slack allowed the brake mechanism in overcoming the inherent flexibility or compressibility of the brake shoe, its lining, the brake drum, etc., and the distance by which the lining clears the drum. Let us suppose, for example, that the friction ring 38 is so positioned in the bore of the cylinder that when the brakes are fully applied with maximum foot pedal pressure, the corresponding piston is moved outwardly so that one shoulder of its groove 36 just contacts the friction ring 38. Then, if the brake lining should thereafter wear a trifle thinner, say, for example, .005 inches and the brakes were thereafter applied with maximum foot pedal pressure, when the piston moved outwardly until it engaged the friction ring 38, the outer face of the lining would still be .005 inches out of maximum contact with the drum. As the foot pressure on the brake pedal continued to build up outward pressure on the piston the pressure would soon exceed the additional force necessary to slide the friction ring along the cylinder bore. When the foot pedal builds up sufficient pressure in the system, the friction ring will be slid along the cylinder bore until the brakes are fully applied. This in the instance assumed above would mean an outward progression of .005 inches for the friction ring. When the foot pedal is again released, the piston, and hence the shoe, will not come back to its former position, but instead to a position .005 inches outwardly from the former position. Thus the range of movement permitted the piston, as represented by the lost motion between the friction ring and cylinder groove, would be progressed (as distinguished from increased) .005 inches.

Similarly for any further wearing down of the lining by infinitesimal degrees, the position of the piston 26 continually progresses outwardly until the lining is worn so far that it has to be renewed. It will be understood, of course, that, after the initial setting of the brakes, as soon as the linings of the two shoes start to wear, the centrally dished cup washers of the two pistons will be carried permanently away from contact with one another. Their stop feature, therefore, is restricted to initial setting of the brakes. It is also to be pointed out that the two pistons may be progressed outwardly at different rates depending upon the wear of the linings of their respective shoes, so that each shoe has its automatic take-up adjustment entirely independent of the other.

Let us assume, as previously suggested, that the friction ring will slide under a force of 85 pounds. The usual cross-sectional area of the cylinder is 1.21 square inches making the corresponding fluid pressure about 70 pounds. Thus, whenever a piston is moved into contact with its friction ring, 70 pounds of the fluid pressure developed in the system goes to overcome the friction of the ring. The retractile springs are strong enough to create a back pressure of 24 or 25 pounds in the fluid system, and the friction and incidental lost motion of flexibility of parts ordinarily takes three or four more pounds of fluid pressure, so that a pressure of some 28 pounds must be developed in the fluid system before the brakes reach a point of minimum substantial braking effect.

In theory, in the operation of my improved braking apparatus, a given brake shoe has practically no braking effect until the foot pedal builds up a pressure of about 28 pounds. Then the braking effect of the particular shoe increases more or less in proportion to the amount of pressure exerted, over the initial requirement of 28 pounds, until the corresponding piston engages its friction ring 38. Then the force required to slide the ring 38 will absorb the next 70 pounds increase in fluid pressure. After the resistance of the friction ring has been overcome, the braking effect can continue in relation to increased fluid pressure substantially as before the piston engaged the ring 38. This means that at one point in the actuation of the foot pedal there is a 70 pound period in the pressure curve which gives no increased braking effect, and the brakes, therefore, would not be applied in true proportion to increased fluid pressure.

In actual practice, however, my automatic take-up device does not present any such objection. In commercial installations a fluid pressure of about 500 pounds will lock the wheels, even on a dry pavement with balloon tires. This pressure is habitually developed when, in an emergency, the driver will "jam on" the brakes as hard as he can. In ordinary practice the advancing of the several friction rings 38 will be done at such times, which would be at relatively long intervals and would probably represent a thousand miles of driving. If the progressions of the friction rings 38 occur only when fluid pressures of more than 500 pounds are developed—which will lock the wheels—the additional 70 pounds of fluid pressure which is absorbed in overcoming the friction of the friction rings does not detract from the braking effect, for at the time the 70 pounds pressure is absorbed the fluid pressure is over the 500 pounds required to lock the wheels, and any additional fluid pressure would be of no avail, even though it were effective on the brake shoes. Another consideration which also obviates the danger of any lack of complete control over the braking effect by foot pressure on the brake pedal, during those times when the 70 pounds pressure is absorbed in sliding a friction ring, is that it will rarely happen that more than one of the eight friction rings 28 will be progressed at any one time. Thus, even though 70 pounds of fluid pressure were absorbed—as regards a particular brake shoe—in sliding its corresponding friction ring 38, the remaining 7/8 of the braking system would not be impaired at all. So averaging the 70 pounds fluid pressure absorbed in sliding a particular friction ring over all eight shoes, the effect on the braking apparatus as a whole would be an absorption of only 8½ pounds or so, which would be negligible in proportion to the some 400 pounds fluid pressure at which the particular friction ring would probably be progressed.

If no means were employed for replenishing the fluid system, even though no losses were occasioned from the leakage, the automatic take-up mechanism above described would soon impair the effectiveness of the full possible movement of the brake pedal because, as each piston is from time to time progressed outwardly, an increasingly large volume of liquid must be taken from the system to compensate for the increasing outward displacement of the piston, and the volume of the fluid system as a whole increases at eight times this rate because there are four wheel brakes and two pistons to each brake. The result would be that the driver would in time find the foot pedal going down to the floor board without giving substantial braking effect. However, with the use of an automatic replenishing device, such for example as that illustrated in Fig. 1, the fluid system remains completely filled with a liquid at all times, and this is true whether the replenishing is merely to compensate for actual fluid losses from the system or to compensate for enlarging of the volume of the system. The important effect of this, or any other replenishing means, in the operation of a system employing an automatic take-up mechanism of the general type I have shown, is that the liquid column may also be extended.

It is not essential to the satisfactory operation of this form of take-up mechanism that the friction ring or other stop 38 be progressible only under a relatively high pressure. All that is really necessary is that it canont be receded under the force of the brake shoe retractile spring 31. Nor is it essential that the force necessary to retract the friction ring 38 be much greater than that necessary to oppose the force of the retractile spring 31. However, it obviously gives a greater security of operation and durability to the apparatus to have the friction ring move only under a relatively large force. The margin of safety is greatly increased and variations in the temper and dimensions of the friction ring will not impair the effectiveness of the automatic take-up.

Attention is further called to the advantages of the form of piston construction I have shown. If the usual piston construction were employed, the bore contacting cylindrical portion of the piston would be of considerable length so as to maintain the axis of the piston in alignment with the axis of the bore. The friction ring 38 would then have to be behind this long cylindrical portion of the piston. It would then be necessary to machine the ring or grind it after it is hardened, so that its piston contacting faces are in planes at a normal to its external cylindrical surface, and also to match the shoulders of the piston groove 36 so that they also are true with respect to the cylindrical surface of the piston. If these contacting parts were not trued up accurately when a long cylindrical piston surface is employed, it would mean that any imperfect contact would tend to bind the piston, causing it to wear prematurely and probably considerably increasing its friction. To avoid the necessity of close machine work and the undue lengthening of the piston and cylinder, I prefer to employ a piston construction which permits the piston to find its own axial position which need not be in alignment with that of the bore. Accordingly I cut down the width of the cylindrical surface of the piston to a minimum immediately adjacent its face, and I conform this to a spherical rather than a cylindrical surface, the spherical surface having the same center point as the center point of the spherical ball and socket connection between the piston and its piston link or rod 27. The force which is transmitted from the piston to the piston link 27 or vice versa has no effect on angularly positioning the piston within the bore of the cylinder because of the coincident location of the center points for these two spherical surfaces. If the faces of the friction ring 38 are not true in reference to its cylindrical surface, when the piston contacts the ring the piston will be turned slightly to fit flatly against the face of the friction ring, even though this may throw the axis of the piston out of alignment with the axis of the bore.

That this piston construction permits the minimizing of the length of the cylinder construction, is obvious.

The open ends of the cylinders are preferably closed by circular rubber aprons 39 to exclude dust and water from the interior. The outer edges of the aprons are preferably beaded to slip over annular grooves near the ends of the cylinders, while their central openings are in direct frictional contact with the respective links 27. This construction permits the progression of the piston links 27 as well as their limited reciprocation, for after the limit of flexibility has been reached they can slide relative to the piston lengths.

When the brake shoes are removed for relining, or when new brake shoe assemblies are substituted, it is not necessary to take the piston and cylinder structure apart in order to set the pistons back at the mid point of the cylinder. Instead, the piston links 27 may be pushed inwardly with a force of 85 pounds or more, which will be sufficient to slide the friction rings back to their initial position. This resetting does not even require the removal of the dust apron 39.

While I have shown this particular embodiment of my invention, I contemplate that many changes may be made thereon without departing from the scope or spirit of my invention.

What I claim is:

1. A wheel brake mechanism for a fluid actuated braking system comprising a cylinder subject to fluid pressure, a piston slidable therein, a packing for the face of the piston, and a stop member having a face for contacting the piston and limiting its movement, the piston being conformed to permit its partial universal movement within the bore of the cylinder, whereby when it is urged against the stop member it may align itself relatively to the face thereof even though in so doing it has to swing out of alignment with the bore of the cylinder.

2. A wheel brake mechanism for a fluid actuated braking system comprising a cylinder subject to fluid pressure, a piston slidable therein, a packing for the face of the piston, a piston link having a partial universal connection with the piston and adapted to actuate a brake element, and a stop member having a face for contacting the piston and limiting its movement, the piston being conformed to permit its partial universal movement within the bore of the cylinder and about its connection with the piston link, whereby when it is urged against the stop member it may align itself relatively to the face thereof independently of alignment with the bore of the cylinder.

3. A wheel brake mechanism for a fluid actuated braking system comprising a cylinder subject to fluid pressure, a piston slidable therein, a packing for the face of the piston, a piston link having a spherical ball and socket connection with the piston and adapted to actuate a brake element, and a stop member having a face for contacting the piston and limiting its movement, the piston being spherically conformed to permit its partial universal movement within the bore of the cylinder and about its connection with the piston link, whereby when it is urged against the stop member it may align itself relatively to the face thereof independently of alignment with the bore of the cylinder, the spherical center points of said ball and socket connection and of said piston being substantially coincident.

4. In a fluid braking apparatus the combination of a brake element, a cylinder, a piston reciprocable therein, a piston link for connecting it to actuate the brake element, and a cup washer for the face of the piston, the face of the piston and its packing having a forwardly projecting central portion, said piston link extending into the interior of said piston from the opposite side thereof and projecting into the said forwardly projecting portion of the piston face.

5. The combination with a fluid braking system of a cylinder, a piston reciprocable therein for actuating a brake element, a piston link connecting the piston with said element and having a ball and socket connection with the piston, and a cup washer for the face of the piston, the face of the piston and its cup washer being centrally forwardly projected, and the center point of the said ball and socket connection being substantially in the plane of the face of the piston.

6. In a fluid actuated braking apparatus the combination with a brake element, a cylinder, a piston reciprocable therein for actuating the brake element, of an automatic take-up mechanism for the piston comprising a friction ring engaging the bore of the cylinder, and cooperating stop portions on the ring and the piston for permitting a limited lost motion therebetween, the friction ring being progressible along the bore of the cylinder but recedable only under pressure exceeding the retractile force upon the piston.

7. In a fluid actuated braking system the combination of a cylinder, a piston reciprocable therein, and an automatic take-up mechanism for the piston comprising a friction ring disposed in the bore of the cylinder slidable there along under heavy pressure, and a lost motion connection between the piston and the ring.

8. The combination with the fluid pressure actuated brake cylinders of a fluid braking system comprising a cylinder and a brake applying piston reciprocable therein, of an automatic take-up device for the piston comprising a member having frictional engagement with the cylinder and a lost motion connection with the piston.

9. In a hydraulic braking apparatus for automobiles, a hydraulically actuated wheel brake device comprising a non-rotatably supported cylinder having open ends, opposed pistons reciprocably mounted therein, connections for communicating between the fluid system and the cylinder intermediate the pistons, cup washers engaging the faces of the opposed pistons, the piston faces and their cup washers being centrally projected to bring the central faces of the opposed cup washers into abutment before their edges meet, said pistons having annular grooves formed therein rearwardly of their faces, split friction rings disposed in the respective grooves and frictionally engaging the bore of the cylinder, the grooves having lost motion connections with the friction rings, brake engaging elements, piston links connecting the brake engaging elements with the pistons for actuation thereby, and positive retractile means for the brake engaging elements which exert a retractile force on the pistons less than that required to slide the friction rings along the bore of the cylinder, the pistons having narrow bore engaging portions spherically conformed to permit rocking of the pistons relatively to the bore to permit them to seat themselves against their respective friction rings, and the piston links having ball and socket engagements with the piston, which connections extend into said central projections of the piston faces and the spherical centers of which are substantially co-incident with those of the said bore-engaging portions.

10. In a hydraulic braking apparatus for automobiles, a hydraulically actuated wheel brake device comprising a non-rotatably supported cylinder having open ends, opposed pistons reciprocably mounted therein, connections for communicating between the fluid system and the cylinder intermediate the pistons, cup washers engaging the faces of the opposed pistons, the piston faces and their cup washers being centrally projected to bring the central faces of the opposed cup washers into abutment before their edges meet, said pistons having annular grooves formed therein rearwardly of their faces, split friction rings disposed in the respective grooves and frictionally engaging the bore of the cylinder, the grooves having lost motion connections with the friction rings, brake engaging elements, piston links connecting the brake engaging elements with the pistons for actuation thereby, and positive retractile means for the brake engaging elements which exert a retractile force on the pistons less than that required to slide the friction rings along the bore of the cylinder, the pistons having narrow bore engaging portions spherically conformed to permit rocking of the pistons relatively to the bore to permit them to seat themselves against their respective friction rings.

11. In a hydraulic braking apparatus for automobiles, a hydraulically actuated wheel brake device comprising a nonrotatably supported cylinder having open ends, opposed pistons reciprocably mounted therein, connections for communicating between the fluid system and the cylinder intermediate the pistons, cup washers engaging the faces of the opposed pistons, said pistons having annular grooves formed therein rearwardly of their faces, split friction rings disposed in the respective grooves and frictionally engaging the bore of the cylinder, the grooves having lost motion connections with the friction rings, brake engaging elements, piston links connecting the brake engaging elements with the pistons for actuation thereby, and positive retractile means for the brake engaging elements which exert a retractile force on the pistons less than that required to slide the friction rings along the bore of the cylinder, the pistons having narrow bore engaging portions spherically conformed to permit rocking of the pistons relatively to the bore to permit them to seat themselves against their respective friction rings.

12. In a hydraulic braking apparatus for automobiles, a hydraulically actuated wheel brake device comprising a non-rotatably supported cylinder having open ends, opposed pistons reciprocably mounted therein, connections for communicating between the fluid system and the cylinder intermediate the pistons, said pistons having annular grooves formed therein rearwardly of their faces, split friction rings disposed in the respective grooves and frictionally engaging the bore of the cylinder, the grooves having lost motion connections with the friction rings, brake engaging elements, mechanism connecting the brake engaging elements with the pistons for actuation thereby, and positive retractile means for the brake engaging elements which exert a retractile force on the pistons less than that required to slide the friction rings along the bore of the cylinder, the pistons having narrow bore engaging portions spherically conformed to permit rocking of the pistons relatively to the bore to permit them to seat themselves against their respective friction rings.

13. In a hydraulic braking apparatus for automobiles, a hydraulically actuated wheel brake device comprising a non-rotatably supported cylinder having open ends, opposed pistons reciprocably mounted therein, connections for communicating between the fluid system and the cylinder intermediate the pistons, said pistons having annular grooves formed therein rearwardly of their faces, split friction rings disposed in the respective grooves and frictionally engaging the bore of the cylinder, the grooves having lost motion connections with the friction rings, brake engaging elements, mechanism connecting the brake engaging elements with the pistons for actuation thereby, and positive retractile means for the brake engaging elements which exert a retractile force on the pistons less than that required to slide the friction rings along the bore of the cylinder.

14. In a fluid actuated braking apparatus, a fluid motor comprising a cylinder communicating with the fluid system, a piston reciprocable therein, a cup washer for the face of the piston, and an automatic take-up mechanism for the piston comprising a friction ring frictionally engaging the bore of the cylinder, and a peripheral groove in the piston embodying opposed shoulders between which the friction ring is disposed, the groove being formed by a reduced shoulder spaced backwardly from the face of the piston, and a second reduced shoulder on the piston over which a washer is disposed with portions of the piston peened over the washer, the washer forming one of the opposed shoulders.

15. As an article of manufacture, a piston for the fluid motor of a fluid braking system comprising a spherically conformed circular face forwardly depressed centrally thereof, a shoulder a spaced distance back from the face forming a rearward cylindrical portion of reduced diameter, and a ring of greater diameter than the reduced portion secured to the rearward end of the piston, the ring forming a shoulder opposed to said first mentioned shoulder with an annular groove therebetween, said piston having a central depression extending into the interior of the piston beyond the plane of the face from the rearward end thereof for the reception of a piston link.

16. As an article of manufacture, a piston for the fluid motor of a fluid braking system comprising a circular face, a shoulder a spaced distance back form the face forming a rearward cylindrical portion of reduced diameter, a ring of greater diameter than the reduced portion secured to the rearward end of the piston, the ring forming a shoulder opposed to said first mentioned shoulder with an annular groove therebetween, and a split friction ring having a normal diameter greater than that of the piston loosely disposed within said groove.

17. In a hydraulic braking system including a brake drum, a brake shoe and a brake shoe lining, the combination of a motor cylinder, a piston structure movable in said cylinder to apply the brake shoe lining against the drum, and a slack take-up mechanism comprising a friction device operating between said cylinder and said piston structure, said device being movable in either direction through the application of abnormal force, the piston structure having a limited amount of free movement with respect to the friction device, the degree of said free movement determining the distance which the brake shoe lining may be retracted.

In witness whereof, I hereunto subscribe my name this 19th day of July, 1926.

MALCOLM LOUGHEAD.